United States Patent
Redman

[11] 3,906,499
[45] Sept. 16, 1975

[54] SCANNER PROJECTOR SYSTEM
[75] Inventor: Charles M. Redman, Las Cruces, N. Mex.
[73] Assignee: The United States of America as represented by the Secretary of the Army, Washington, D.C.
[22] Filed: May 22, 1974
[21] Appl. No.: 472,267

[52] U.S. Cl. ................................. 343/17.7; 35/10.4
[51] Int. Cl.² ......................... G01S 7/40; G01S 9/00
[58] Field of Search ........... 343/17.7, 6 ND; 35/10.4

[56] References Cited
UNITED STATES PATENTS

| | | | |
|---|---|---|---|
| 3,114,910 | 12/1963 | Rymes | 343/17.7 |
| 3,336,594 | 8/1967 | Hotz et al. | 343/17.7 |
| 3,365,579 | 1/1968 | Emshwiller | 343/17.1 R |
| 3,439,105 | 4/1969 | Ebeling et al. | 35/10.4 X |
| 3,832,712 | 8/1974 | Goetz | 343/17.7 |

Primary Examiner—Malcolm F. Hubler
Attorney, Agent, or Firm—Nathan Edelberg; Robert P. Gibson; Saul Elbaum

[57] ABSTRACT

A scanner projector system for simulating land, weather, chaff clouds, or other background conditions surrounding a target to a radar system is described. The projector system includes a laser beam generator having an external feedback loop and a traveling wave scanner for deflecting a portion of said laser beam through a recorded scenario film including a density pattern corresponding to the background conditions surrounding at target. The traveling wave scanner simulates the manner in which an actual radar beam scans a test scenario while the scenario film simulates the reflectivity of the background conditions.

11 Claims, 4 Drawing Figures

SCANNER PROJECTOR SYSTEM

RIGHTS OF THE GOVERNMENT

The invention described herein may be manufactured, used, and licensed by or for the United States Government for governmental purposes without the payment to me of any royalty thereon.

BACKGROUND OF THE INVENTION

1. Field of Invention

The present invention relates to a scanning projection system for simulating to a radar system land, weather, chaff, or other background environmental conditions surrounding a target.

The Scanner Projector System (SPS) of the present invention is a subsystem or part of the Radar Test Chamber which in turn is a major part of the Missile Weapons System Test Facility (MWSTF). The MWSTF is required to isolate the Weapon System under test from the outside world. It must then simulate to the radar the type of world that test scenario requires; to include ground clutter from hills, buildings, vehicles; weather clutter from clouds, rain and dust, and man-made clutter such as that from chaff. This simulation of test scenario is most essential when testing weapons utilizing complex phased array radars and sophisticated digital data processor and storage systems.

2. Description of Prior Art

Air defense weapons have been traditionally tested by firing missiles at target drones to evaluate the effectiveness of the radar guidance systems. A reasonably complete test by this method can require in excess of thirty-eight years and one billion dollars. A solution to this problem has been to develop a missile weapons system test facility (MWSTF) to isolate the weapons system from the outside world and to simulate a test scenario.

One of the most difficult problems in the development of the MWSTF is the simulation of land, weather, and chaff to the radar test chamber (RTC). Heretofore no satisfactory systems have been developed for simulating a test scenario which are realistic enough to be suitable. Prior art techniques have included attempts to add noise to radar inputs on the assumption that the noise might be representative of land, weather, and chaff clutter. However, these techniques have not proven to be adequate to facilitate an accurate test of the radar system.

SUMMARY OF INVENTION

Accordingly, it is an object of the present invention to provide a scanning projector system which realistically simulates to a radar system a test scenario surrounding a target.

It is a further object of the present invention to perform this simulation in coordination with a large angle simulation test array comprising part of a radar test chamber.

It is another object of the present invention to provide a scanning projector system for simulating a test scenario with sufficient data for testing complex phased array radar systems.

The objects of the present invention are fulfilled by providing a scanning projector system comprising: laser generation means having an external feedback loop for sustaining laser generation; means for expanding and collimating the laser beam into an elongated narrow beam and for directing said beam toward an acousto-optical traveling wave scanner; means for transducing a RF radar pulse into an acoustic pulse and directing the acoustic pulse through said traveling wave scanner; said acoustic pulse deflecting a portion of said laser radiation toward a recorded scenario film; means for expanding said deflected portion of said laser beam into a fan shaped beam; and means for receiving the fan shaped beam after it passes through said scenario film; whereby the traveling wave scanner simulates the manner that an actual radar signal moves across at test scenario and the scenario film simulates the reflectivity of the land, weather, or chaff clutter surrounding the target in the test scenario.

The scanning projector system (SPS) operates with a 28,000 element Angle Simulation Test Array (ASTA). The SPS generates the test scenario as a complex differential signal between two infrared (IR) signals. One signal, a reference, is projected onto all 28,000 elements. This is used as a reference for not only the SPS but also all the Target Simulation Systems and Electronic Countermeasures Simulation Systems that are required for the simulation of target threats. The SPS scans the ASTA in time and elevation with an azimuth fan beam of IR signals modulated in intensity in azimuth by a scenario film. These IR signals are offset in frequency from the reference IR signal by the frequency of the radar. The radar under test may have too high a frequency for direct modulation of the SPS so an intermediate frequency is required.

BRIEF DESCRIPTION OF DRAWINGS

The objects of the present invention and the attendant advantages thereof may be better understood by reference to the following drawings wherein.

DETAILED DESCRIPTION OF DRAWINGS

Figure 1:
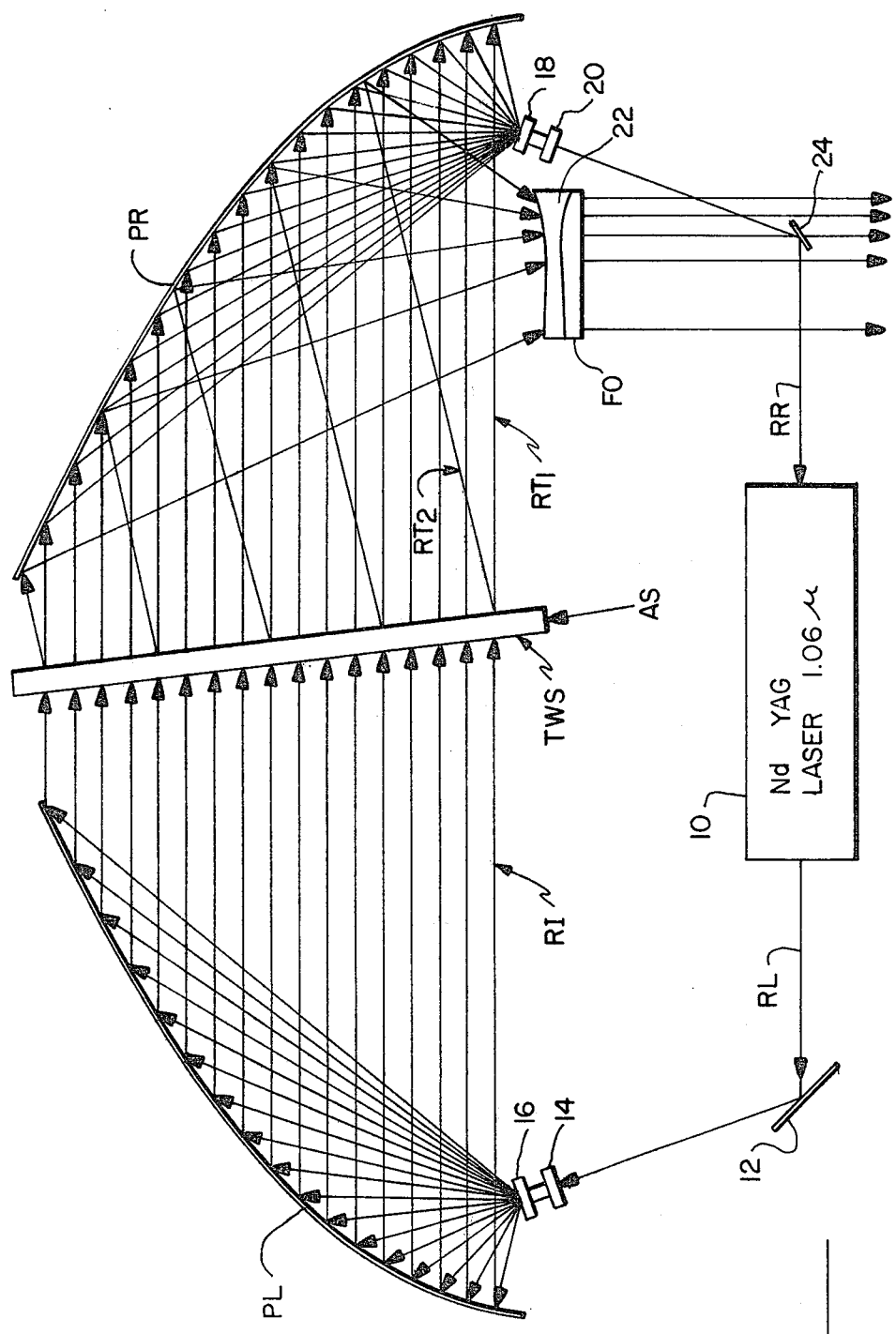
FIG. 1 illustrates a first portion of the scanner projector system of the present invention.

Referring in detail to FIG. 1 there is illustrated in diagramatic form the scanner projector system of the present invention including a laser 10 having an external feedback loop to sustain laser action. In a preferred embodiment the laser chosen is a Nd-YAG laser which emits radiation in the 1.06 micron or IR range.

The radiation loop supports radiation in only one direction through use of a differential loss factor. The differential loss is created in the Nd-YAG rod by Faraday rotation. A number of turns of wire around the rod are electrically driven to cause first a differential phase shift (Faraday rotation) around the loop; second, the clockwise radiation is adjusted to an exact whole number of wavelengths; and third, the counterclockwise radiation is adjusted to be about a half wavelength off, causing phase cancellation and loss.

The laser 10 emits a beam of radiation RL from the left side thereof, as shown in FIG. 1, onto a reflector or mirror 12 and into a beam expander 14. Expander 14 disperses the beam into a plurality of beams which pass through diverging lens 16 whereby the beams are fanned out over the surface of a parabolic reflector PL. The fanned out beam is about 1mm thick and 115° across.

The parabolic surface of reflector PL is a two dimensional device which collimates the incident radiation into a plurality of parallel reflected beams RI. The parallel reflected beams are directed toward the crystal of traveling wave scanner TWS to be described in more detail hereinafter with respect to FIG. 4. Scanner TWS is an acousto-optic modulator of a type which is known in the art. The reflected beams from reflector PL are incident upon scanner TWS at angle of 7° with respect to a perpendicular thereto.

Radiation incident upon the crystal of TWS normally passes directly through said crystal as shown by beams RT1 but when modulated by an acoustic signal AS is diffracted by the acousto-optical action to be described hereinafter, as shown by beams RT2.

The radiation passing directly through TWS is utilized to effect sustained laser action of laser 10. This radiation is incident upon the reflecting surface of a second parabolic reflector PR which is substantially identical to reflector PL. The parallel radiation beams incident on PR pass into a diverging lens 18 and a beam expander 20 similar to elements 14, 16 which because of the law of the reversibility of optics function in reverse of elements 14, 16 to converge the beams reflected from PR into a single beam of radiation. This single beam is reflected from a reflector 24 to form a beam RR which returns to the right side of laser 10. The size of reflector 24 is chosen to provide minimum interference with radiation RT2 to be described hereinafter.

The entire loop from Laser 10 to the first Parabola PL to the second Parabola PR and back to the Laser 10 is all part of the basic Laser. The phase of the radiation must maintain proper alignment all around the loop to cause laser action. Theoretically the two parabolic surfaces maintain the proper phase relationship. The distance from the point of divergence of the left parabolic surface PL to the point of divergence of the right surface is the same whether the radiation reflects off the top or bottom of the parabolas. The Parabolas PL, PR, Traveling Wave Scanner TWS, and the Laser 10 are all mounted on a rigid surface in a temperature controlled area. Small adjustments of each parabolic surface are required to maximize the laser action.

The above description of the loop and laser action assumes that the radiation exits the Traveling Wave Scanner TWS at the same angle it entered (7° below the perpendicular). If this condition is satisfied, the TWS does not affect the laser action.

Figure 4:
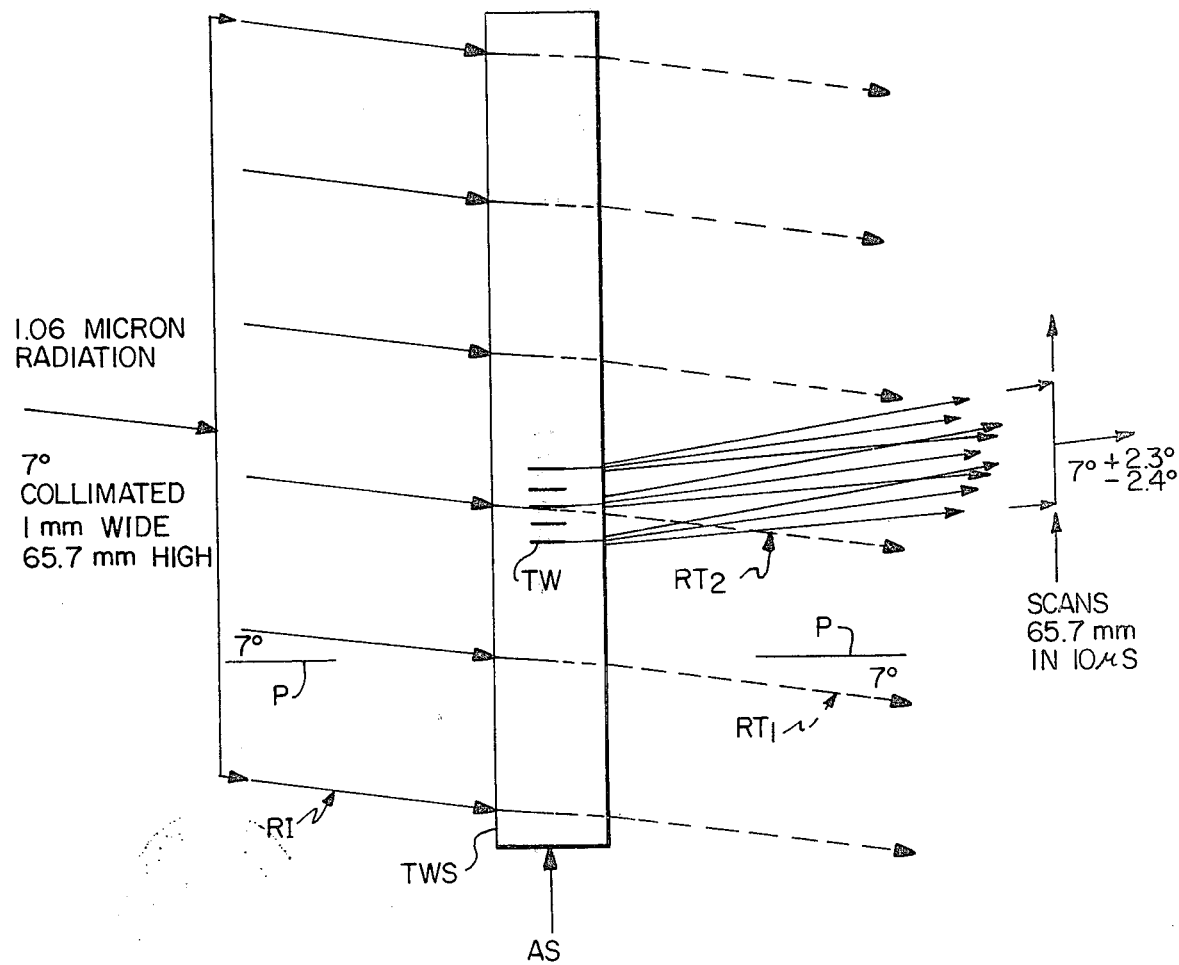
FIG. 4 illustrates in the operation of the traveling wave scanner in the system of FIG. 1.

The traveling wave scanner TWS of FIG. 1 is illustrated in more detail in FIG. 4. The function of the TWS is to simulate the manner in which actual radar signals move across or through land, weather, clouds chaff clutter, and the general reflective environment other than targets that radar is subject to. However, the velocity of propagation is reduced by a factor of $10^5$. There are several important factors to be considered in selecting a material for the TWS. Transmission losses to both the acoustic and IR signals must be low. The acousto-optic interaction figure of merit must be high. The index of IR refraction and the acoustic velocity should both be high. The materials should be available in very long lengths and small cross section. Lithium Niobate selected for use with the present invention is a compromise type of material. Its acousto-optic figure of merit is only about 4.66 times better than quartz so it takes a relatively large amount of acoustic power to control the IR signal. Its acoustic losses (0.368 db/$\mu$s) are over twice as high as MgO $Al_2O_3$ but low enough to readily allow a TWS to operate to a 300 $\mu$s (equivalent to 45KM radar range). Its index of refraction and acoustic velocity are large enough to keep the angular changes in TWS output reasonably small; 4.6° at 1.25 GHz and 9.3° at 1.75 GHz.

The active length of the TWS in the present invention is 65.7mm. For a Lithium Niobate ($LiNbO_3$) crystal of this length, it takes 10$\mu$s crystal for an acoustic signal AS to go the active length of the single crystal. Radar range for 10$\mu$s is 1,500 meters or almost 1 mile. Modern technology allows single crystals to be pulled to very long lengths so the 10$\mu$s is not limiting. Acoustic losses in $LiNbO_3$ are quite high for delays over 300$\mu$s so it is doubtful that a practical TWS can exceed 45KM or about 30 mi.

As shown in FIGS. 1 and 4 it may be assumed for the purposes of an example that an acoustic signal AS of 1$\mu$s duration in the frequency range of 1.25–1.75GHz is applied to one end of the TWS.

As the 1$\mu$s pulse moves up the TWS it deflects the incident Radiation RI through Bragg scattering at an angle of 7° above the perpendicular P to the crystal; that is 14° above the undeflected radiation RT1. The deflected radiation RT2 strikes the second parabolic surface at an angle that will not deflect it to diverging and expanding elements 18, 20.

The acoustic traveling wave TW is illustrated in FIG. 4 as it scans the length of the TWS crystal. As can be seen, when the incident radiation encounters the traveling wave TW it is selectively deflected according to Bragg's Law. The exit angle of the radiation RT2 may have a beam spread of +2.3° to −2.4° for an acoustic signal frequency range of 1.75 GHz to 1.25 GHz respectively.

Referring again to FIG. 1 the deflected or diffracted radiation RT2 because of the angle of deflection is out of alignment with parabolic mirror PR. Therefore, radiation beams RT2 are deflected to a collimator lens 22 designed to correct for the 14° misalignment with respect to parabolic mirror PR and recollimate it as shown.

Figure 2:
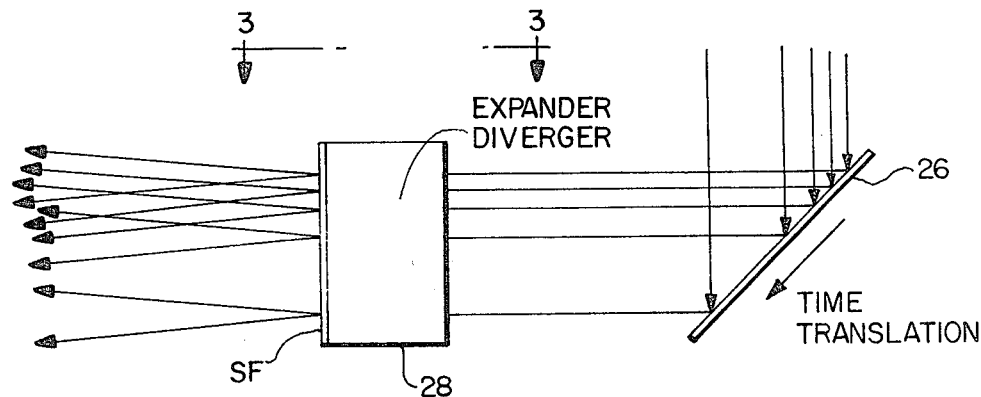
FIG. 2 illustrates a second portion of the scanner projector system of FIG. 1.

The recollimated radiation, as shown in FIG. 2 impinges upon a time translating reflector 26. Reflector 26 is said to be time translating since the beams that are incident thereon are separated in time by the traveling wave scanner TWS and occupy discrete positions on reflector 26 in relationship to the scanning function of the TWS.

Figure 3:
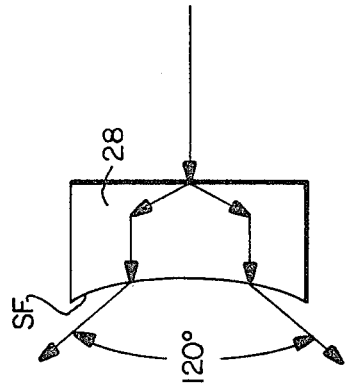
FIG. 3 illustrates a top plan view taken in the direction of lines 3—3 in FIG. 2.

As shown in FIG. 2, the radiation reflected from reflector 26 then passes into an expander-diverger 28 having a scenario film SF on one surface thereof. The expander-diverger 28 causes the radiation to fan out. For example, an IR signal 6.57mm by 1mm is fanned out by expander-diverger 28 to a beam 120° in azimuth and 2° in elevation. The 120° azimuth spread of this beam is illustrated in FIG. 3 and the 2° elevation spread is indicated in FIG. 2.

The purpose of the scenario film SF is to simulate the reflectivity of the land, weather, chaff clutter, or other conditions of reflectivity not generated by the target.

As the fan beam scans the scenario film SF the intensity is modulated according to the density of the film.

As an example, the portion of film simulating the front of a mountain would be correspondingly transparent, whereas, that part of the film simulating the distance behind the mountain would be opaque.

The output of radiation from the scenario film is directed to an angle simulation test array (ASTA) in a radar test chamber or other suitable utilization means.

The scanner projection system of the present invention can be designed to overcome one potential problem. As the radar transmission frequency of acoustic signal AS varies from the low side of the bank (−0.25GHz) to the high side of the band (+0.25GHz) the angle of the IR deflected by the acoustic pulse changes from 4.6° to 9.3°. This causes the beam to wobble, spread, or contract. A radar signal chirped from low to high would expand the beam while a high to low chirp would contract it. A frequency agile radar would cause simulated mountains to move in elevation as the frequency changes. A solution to this problem is to mount a fiber optic plate FO along the entire input or output side of the recollimator 22. The fibers would be slanted to match the deflected radiation's angle if on the input end parallel to collimated radiation if on the output. The scanning IR would travel through the fibers and align the angular spread. Typical fiber optic plates would not solve this problem as the fibers are so large in diameter that the IR would bounce back and forth and exit with about as much angular spread as it entered. The fibers must approach waveguide diameters which for a 1.06 laser line would be 0.53 if the waveguide index of refraction is 2. A second solution would be to mount the fiber optic plate at the output side of the TWS and align the fibers with the deflected radiation RT2. Provided the fibers were $LINbO_3$ which has an index of refraction of 2.2 and the fiber's having an index of 2.13 the plate would accept an optical input cone of approximately 5° about the signal IR. The undeflected (IR) RT1 would go through the fiber optics at an angle of 14° and essentially be uneffected by the fibers.

DESCRIPTION OF OPERATION

In the operation of the system of the present invention a radar transmission signal is heterodyned to the 1.5 ± .25 GHz band and transduced into and applied as a 1MS pulse to one end of traveling wave scanner TWS as an acoustic signal AS. An infrared signal (IR) is continuously generated by laser 10 which passes through the TWS crystal at an angle of 7° to the perpendicular as described hereinbefore. As the acoustic traveling wave TW moves up the crystal of TWS at $6.57 \times 10^3$ M/S, it deflects a 6.57mm beam of IR radiation RT2 as it travels therethrough. This beam RT2 is reflected off of the second parabolic reflector PR, recollimated by collimator 22, fiber optical element FO, and directed toward the angle simulation test array (ASTA) by reflector 26. The radiation pass through expander diverger 28 and a recorded scenario film SF enroute to the (ASTA). The expander-diverger 28 fans the beam out to 120° azimuth and 2° elevation.

The traveling wave scanner TWS simulates the manner that the actual radar signal moves across or through land, weather, and chaff while the scenario film simulates the reflectivity of the land, weather, or chaff clutter.

The fan beam is offset in frequency from the laser IR by 1.5 ± .25GHz. For a radar in this band the laser of FIG. 1 would be locked in phase to the master reference laser illuminating the entire ASTA. For other radars the laser of FIG. 1 has to be offset. The laser would be offset +3.95GHz from the master laser for a radar operating at 5.45 ± .25GHz.

It may be feasible to use one Scanning Projector System to simulate all the ground clutter, weather clutter, chaff, and any other clutter type test requirement, however, several systems, each covering a lesser part of space would be more practical. A 10 mile Scanning Projector System can simulate objects in any 10 mile sector of space by suitable delaying the radar signal before transducing it into the TWS. The azimuth angular sector can also be reduced. One Scanning Projector System might be set to cover 0–5 miles range, 120° azimuth, and 10° elevation. A second Scanning Projector System could simulate a mountainous group out at some greater range. A third might simulate a high, distant chaff cloud. Several smaller Scanning Projector Systems would allow more accuracy and flexibility.

I wish it to be understood that I do not desire to be limited to the exact details of construction shown and described, for obvious modifications can be made by a person skilled in the art.

What is claimed is:

1. A scanner projector system for simulating to a radar system background conditions of a test scenario comprising in combination:
   a. means for generating a laser beam;
   b. travelling wave scanner means;
   c. means for directing said laser beam through said travelling wave scanner means;
   d. means for transmitting a radar signal through said travelling wave scanner in a direction transverse to said laser beam, said radar signal selectively deflecting a portion of said laser beam;
   e. means for directing said deflected portion of said laser beam along a predetermined path; and
   f. scenario film means disposed in said predetermined path, said scenario film comprising a recorded variable density representation of the background conditions of said test scenario;
   whereby said travelling wave scanner simulates the manner in which an actual radar signal scans said test scenario and said scenario film simulates the reflectivity of the background in said test scenario.

2. The projector system of claim 1 wherein said means for generating a laser beam comprises a source of laser radiation and an external feedback loop through said traveling wave scanner and back to said source to sustain laser action.

3. The projector system of claim 1 wherein said traveling wave scanner comprises a crystal means which normally transmits optical radiation without deflection but which permits the deflection of said optical radiation by an acoustic traveling wave therein.

4. The projector system of claim 3 wherein said radar signal is an acoustic signal and said laser beam includes radiation in the infrared range.

5. The projector system of claim 1 wherein said means for directing said laser beam through said travelling wave scanner comprises means for fanning out said beam and means for collimating said fanned out beam into an elongated narrow beam.

6. The projector system of claim 5 wherein said collimating means comprises a first parabolic reflector.

7. The projector system of claim 1 wherein means are provided in the path of said deflected radiation for collimating said radiation before said radiation passes through said scenario film.

8. The projector system of claim 7 wherein beam expander means is provided in said deflected beam path for fanning out said collimated radiation before said radiation passes through said scenario film.

9. The projector system of claim 1 wherein said radar signal wobbles from a low to high frequency causing the angle of deflection of said deflected radiation to vary and means are provided for correcting for the wobble of said radar signal.

10. The projector system of claim 9 wherein said correcting means comprises fiber optical means disposed in the deflected beam path for properly aligning said deflected radiation beams.

11. The projector system of claim 1 wherein said means for directing said deflected portion of said laser beam along a predetermined path comprises a second parabolic reflector.

* * * * *